United States Patent [19]

Tomiyama et al.

[11] Patent Number: 5,161,067
[45] Date of Patent: Nov. 3, 1992

[54] OBJECTIVE LENS DRIVING APPARATUS FOR AN OPTICAL RECORDING AND/OR REPRODUCING APPARATUS

[75] Inventors: Takamichi Tomiyama, Tokyo; Hitoshi Nara, Kanagawa; Osamu Adachi, Tokyo, all of Japan

[73] Assignee: Sony Corporation, Tokyo, Japan

[21] Appl. No.: 508,558

[22] Filed: Apr. 13, 1990

[30] Foreign Application Priority Data

Apr. 20, 1989 [JP] Japan ................... 1-101258

[51] Int. Cl.⁵ .................... G02B 7/02; G11B 7/00
[52] U.S. Cl. .................. 359/824; 359/814; 369/44.16
[58] Field of Search .......... 350/247, 252, 255, 257; 369/44.11–44.19, 44.21–44.22; 359/811, 819, 823–827, 813, 814; 267/192, 193, 245–247

[56] References Cited

U.S. PATENT DOCUMENTS

| 4,596,444 | 6/1986 | Ushida | 350/247 |
|---|---|---|---|
| 4,596,448 | 6/1986 | Kikuchi | 350/247 |
| 4,720,088 | 1/1988 | Tamura | 350/247 |
| 4,766,583 | 8/1988 | Oinoue et al. | 350/255 |
| 4,818,066 | 4/1989 | Nose | 350/247 |
| 4,878,214 | 10/1989 | Hinotani | 350/247 |
| 4,922,477 | 5/1990 | Miura | 350/247 |

FOREIGN PATENT DOCUMENTS

| 376531 | 4/1990 | European Pat. Off. | |
| 130840 | 10/1981 | Japan | 369/44.15 |
| 198551 | 12/1982 | Japan | 359/819 |
| 60-98530 | 6/1985 | Japan | |
| 60-101732 | 6/1985 | Japan | |
| 61-85640 | 5/1986 | Japan | |
| 37733 | 2/1989 | Japan | 369/44.16 |
| 269243 | 10/1989 | Japan | 359/824 |
| 334904 | 10/1989 | Japan | |
| 290132 | 11/1989 | Japan | 359/822 |

Primary Examiner—Bruce Y. Arnold
Assistant Examiner—Thong Nguyen
Attorney, Agent, or Firm—Lewis H. Eslinger; Donald S. Dowden

[57] ABSTRACT

An optical pickup device with an objective lens movable in two directions comprises a supporting member having a plate-shaped supporting portion mounted with a bobbin to which an objective lens is attached. The bobbin is mounted so that it can be freely moved in a first direction parallel to the optical axis of the objective lens and/or in a second direction perpendicular to the optical axis of the objective lens, and an electromagnetic driving device drives the bobbin in the first and second directions. The supporting member is unitarily formed with four arms supporting the bobbin at one end and a coupling portion for connecting the four arms at the other end.

4 Claims, 6 Drawing Sheets

Bonding Process

FIG. 4B

Cutting Process

First Bending Process

Second Bending Process

Third Bending Process

OBJECTIVE LENS DRIVING APPARATUS FOR AN OPTICAL RECORDING AND/OR REPRODUCING APPARATUS

BACKGROUND OF THE INVENTION

1. Field of the Invention

The present invention relates generally to an objective lens driving apparatus for use with an optical pickup device of an optical disc recording and/or reproducing apparatus. More particularly, this invention relates to a supporting structure for supporting a movable portion including an objective lens so that the movable portion can be freely moved.

2. Description of the Prior Art

Generally, an optical disc apparatus utilizes an optical pickup device to write and/or read a signal in and/or from an optical disc. The optical pickup device includes a light source such as a semiconductor laser element or the like. A laser beam emitted from the light source is focused on a signal recording surface of an optical disc and a laser beam reflected on the signal recording surface is detected by an optical detecting element. An information signal is thereby written on and/or read from the optical disc.

The optical pickup device includes an objective lens driving apparatus to move the objective lens in two directions, i.e., the direction (focusing direction) parallel to the optical axis of the objective lens and the direction (tracking direction) perpendicular to the optical axis of the objective lens by an electromagnetic driving force. By virtue of the objective lens driving apparatus, the laser beam can accurately scan recorded tracks formed on the signal recording surface of the optical disc.

This type of objective lens driving apparatus according to the prior art employs a leaf spring as a supporting member for moving the objective lens 50 that the objective lens can be moved in the two directions (see Japanese Patent Application No. 63-334904 previously proposed by the assignee of the present invention).

Figure 1:
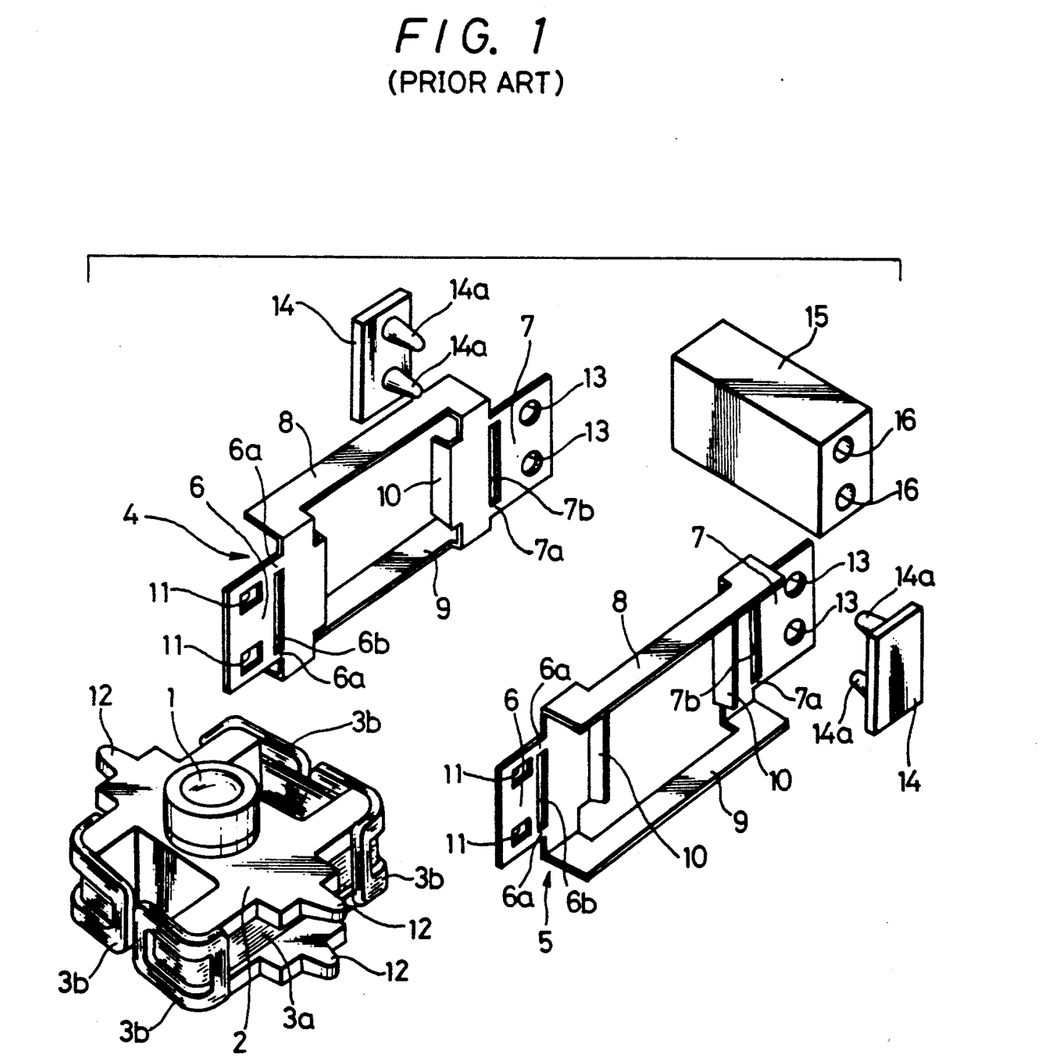
FIG. 1 is an exploded, perspective view of an example of a prior-art objective lens driving apparatus.

FIG. 1 shows an arrangement of this type of objective lens driving apparatus.

It will be seen in FIG. 1 that an objective lens 1 is supported by a bobbin 2. A focusing coil 3a and tracking coils 3b are mounted on the bobbin 2 as electromagnetic driving means for driving the objective lens 1. The bobbin 2 is supported by a pair of supporting members 4 and 5 provided at the left and right sides of the bobbin 2 so that it can be moved in the first direction (focusing direction, i.e., vertical direction) parallel to the optical axis of the objective lens 1 and in the second direction (tracking direction, i.e., horizontal direction) perpendicular to the optical axis of the objective lens 1. The supporting members 4 and 5 are formed of leaf springs such as a stainless steel leaf spring having a predetermined rigidity. The supporting members 4 and 5 are the same in shape and are located symmetrically to each other.

More specifically, each of the leaf springs forming the supporting members 4 and 5 is integrally composed of front and rear supporting plate portions 6 and 7 and upper and lower arm portions 8 and 9 coupling the two supporting plate portions 6 and 7. The arm portions 8 and 9 are bent horizontally relative to the vertical supporting plate portions 6 and 7. Slits 6b and 7b are formed through the vertical supporting plate portions 6 and 7, respectively, so that displacement portions 6a and 7a are formed on the supporting plate portions 6 and 7 thereby to enable the objective lens 1 to be moved in the direction perpendicular to the optical axis, i.e., the tracking direction.

There is shown a tab 10 which is bent in order to maintain a predetermined rigidity of the supporting members 4 and 5 in the vertical direction. Rectangular apertures 11 are formed through the supporting plate portions at one end side, i.e., front side supporting plate portions 6. When protrusions 12 projected from the side portion of the bobbin 2 are in engagement with the rectangular apertures 11 and the heads of the protrusions 12 are caulked, the bobbin 2 is secured to the front ends of the supporting members 4 and 5.

Apertures 13 are formed through the other end side, i.e., rear supporting plate portions 7, and the supporting members 4 and 5 are attached to a fixed base portion 15 by engaging fixing members 14 in the apertures 13. More precisely, apertures 16 formed through two side portions of the base portion 15 are made corresponding with the apertures 13 of the supporting members 4 and 5 and protrusions 14a of the fixing members 14 penetrate into the apertures 13 and 16 to be secured thereto.

In this objective lens driving apparatus, a magnet and a yoke are provided at the stationary side in an opposing relation to the focusing coil 3a and the tracking coils 3b and a magnetic circuit is constructed between the magnet and the yoke. The magnet and yoke are not shown in FIG. 1 because they are not so important in order to explain the present invention.

In the objective lens driving apparatus thus constructed, the bobbin 2 is supported by the left and right supporting members 4 and 5 so that the bobbin 2 can be moved in the two directions. When the tracking coils 3b are supplied with a predetermined tracking current, the displacement portions 6a and 7a of the two supporting members 4 and 5 are flexed in the horizontal direction in parallel to each other, whereby the bobbin 2 is positionally moved in the second direction perpendicular to the optical axis of the objective lens 1 and the tracking is performed. When on the other hand the focusing coil 3a is supplied with a predetermined focusing current, the arm portions 8, 8 and 9, 9 of the two supporting members 4 and 5 are flexed in the vertical direction in parallel to each other, whereby the bobbin 2 is positionally moved in the first direction parallel to the optical axis of the objective lens 1 and the focusing of the laser beam is performed.

In the above-described prior-art objective lens driving apparatus, the supporting members for supporting the objective lens are independently provided at the left and right sides of the bobbin so that characteristics (spring constant, resonance frequency, etc.) of the leaf springs forming the two supporting members fluctuate. As a result, the objective lens is not driven regularly, causing the optical axis of the objective lens 1 to be inclined or displaced from the correct state. This phenomenon will be hereinafter referred to as a so-called optical axis inclination or irregularity for simplicity. To avoid this defect, the characteristics of the two leaf springs must be made the same, which requires a strict administration of assembly parts. Consequently, the objective lens driving apparatus become quite expensive. Further, in the assembly process, the two supporting members must be secured with high positional accuracy, which as a result requires the increase of the assembly process. Therefore, the objective lens driving apparatus according to the prior art becomes further expensive. As described above, the prior-art objective lens driving apparatus has various problems to be solved.

OBJECTS AND SUMMARY OF THE INVENTION

Accordingly, it is an object of the present invention to provide an improved objective lens driving apparatus which can eliminate the aforementioned defects encountered in the prior art.

More specifically, it is an object of the present invention to provide an objective lens driving apparatus of a simplified arrangement in which a so-called optical axis inclination or irregularity can be avoided.

It is another object of the present invention to provide an objective lens driving apparatus in which an administration of assembly parts can be carried out with ease.

It is a further object of the present invention to provide an objective lens driving apparatus in which the number of assembly processes can be reduced.

It is still another object of the present invention to provide an objective lens driving apparatus which can be made inexpensive.

As a first aspect of the present invention, an optical pickup device with objective lens movable in two directions comprises a supporting portion formed of a bobbin to which an objective lens is attached, a supporting member formed of a plate-shape having a predetermined rigidity for supporting the bobbin so that the bobbin may be moved at least in one of a first direction parallel to an optical axis of the objective lens and a second direction perpendicular to the optical axis of the objective lens, and an electromagnetic driving device for driving the bobbin so that the bobbin is moved in the first and second directions, wherein the supporting member of the supporting portion is unitarily formed of four arm portions for supporting the bobbin at one end side and a coupling portion for coupling the four arm portions at the other end side of the four arm portions.

In accordance with a second aspect of the present invention, there is provided a method of manufacturing a supporting member of an objective lens driving apparatus in which a bobbin with an objective lens is attached to one end side of four arm portions so that the bobbin can be moved in a first direction parallel to an optical axis of the objective lens and/or in a second direction perpendicular to the optical axis of the objective lens and a supporting member is provided with a coupling portion for coupling the four arms at the other end side. This method for manufacturing said supporting member comprises the steps of a separating step for separating an expanded-shape supporting member from a metal thin plate in which a plurality of expanded-shape members of the supporting member are formed, a first bending step for bending the expanded-shape member separated in the separating step to form four arm portions, and a second bending step for bending the expanded-shape member under the condition that the four arm portions are formed to thereby form a pair of supporting portions.

These and other objects, features and advantages of the present invention, will be apparent in the following detailed description of the preferred embodiments when read in conjunction with reference to the accompanying drawings, in which like reference numerals are used to identify the same or similar parts in the several views.

DETAILED DESCRIPTION OF THE PREFERRED EMBODIMENTS

The present invention will now be described in detail with reference to FIGS. 2 to 7.

In FIGS. 2 to 7, parts corresponding to those of FIG. 1 are marked with the same references and therefore need not be described in detail.

Figure 2:
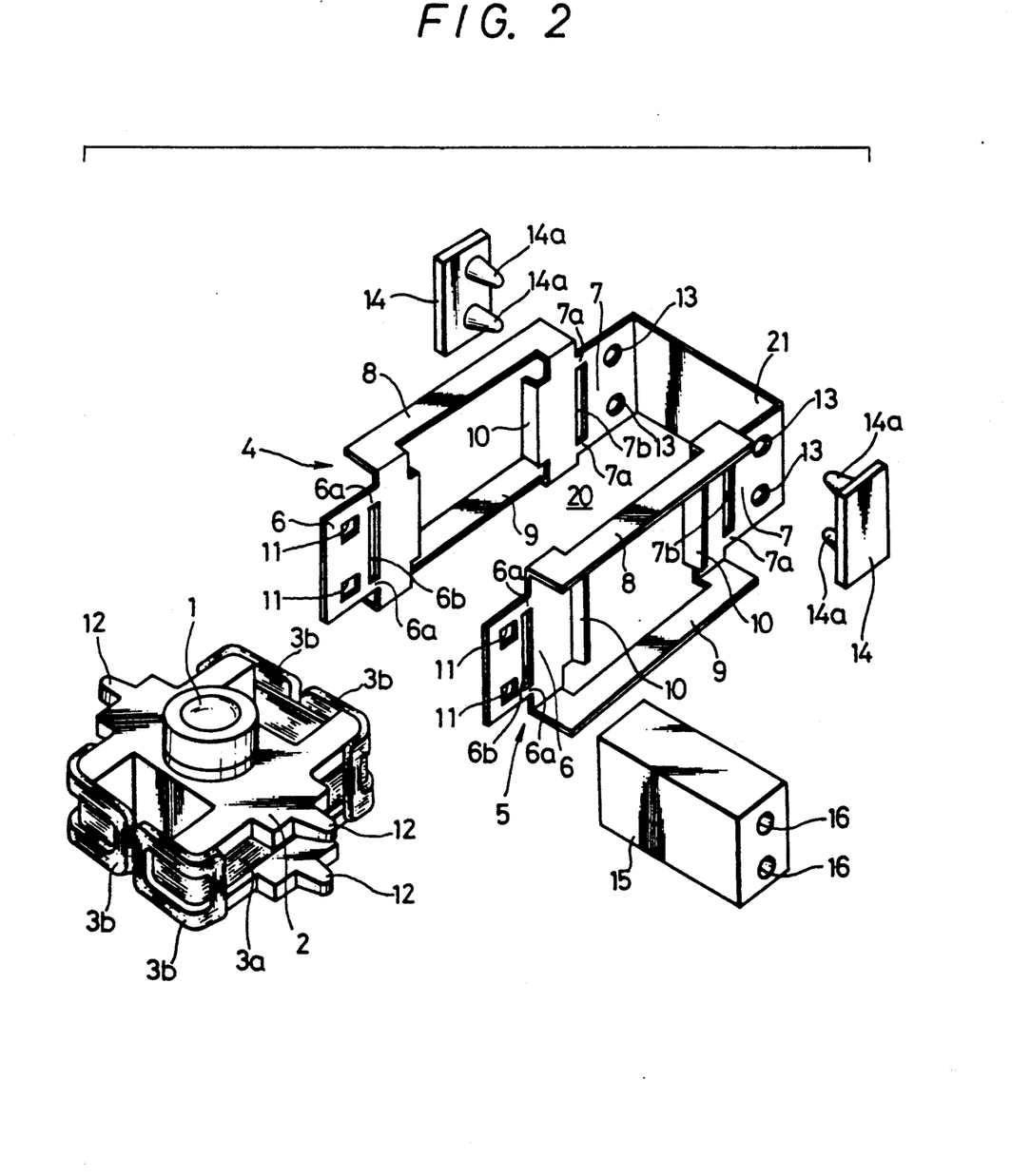
FIG. 2 is an exploded, perspective view illustrating a first embodiment of an objective lens driving apparatus according to the present invention.
Figure 3:
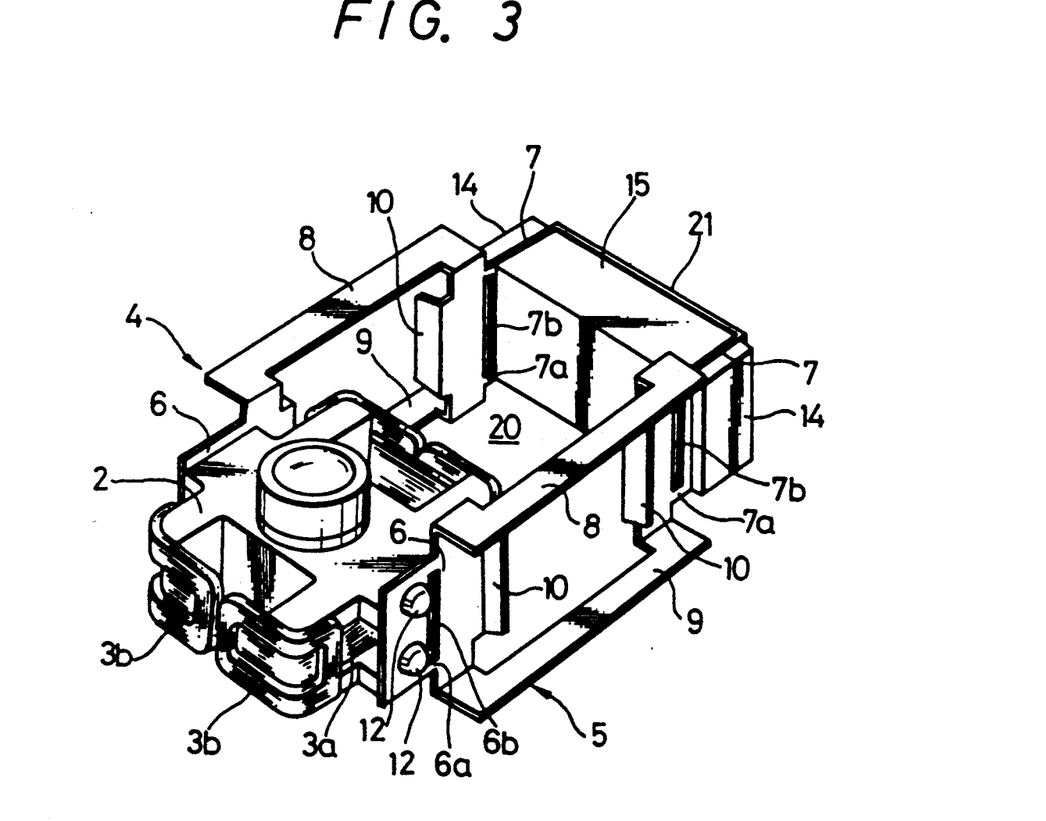
FIG. 3 is a perspective view of the first embodiment of the objective lens driving apparatus according to the present invention, and illustrating the assembled state of the objective lens driving apparatus.

Referring to the drawings in detail, and initially to FIGS. 2 and 3, a supporting member, depicted by reference numeral 20 in this embodiment, is formed by unitarily forming the left and right supporting members 4 and 5 of the above-mentioned example of the prior art.

More precisely, a coupling plate member 21, which couples the rear supporting plate portions 7 and 7 of the two supporting members (hereinafter referred to as supporting portions) 4 and 5, is unitarily formed as one body with the supporting plate portions 7 and 7. In other words, the supporting member 20 is formed of one leaf spring, i.e., formed as one body with four arm portions 8, 8 and 9, 9 for supporting at one end side the bobbin 2 and the coupling plate portion 21 which couples at the other side the four arm portions 8, 8 and 9, 9.

The and the manufacturing process of the supporting member 20 will be described with reference to FIGS. 4A, 4B and FIGS. 5A to 5D.

Figure 4A:
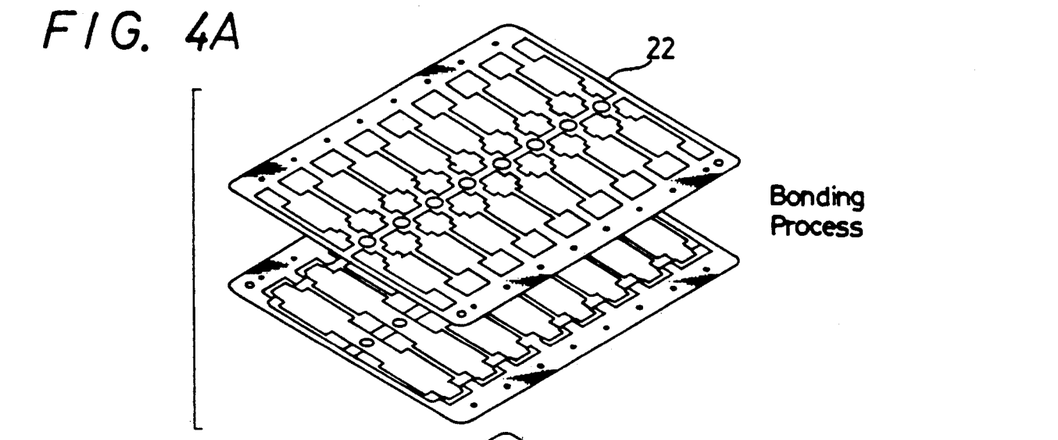
FIG. 4A is a perspective view illustrating a bonding process in accordance with the invention.

As shown in FIG. 4A, a plurality of supporting members 20 expanded by the etching treatment or the punching treatment are formed on a single metal thin plate 22. A plurality of leaf springs, which become a material of the supporting member 20, are formed on the single metal thin plate 22 by the punching treatment simultaneously. Then, this leaf spring is removed from the metal thin plate 22 (see FIG. 5A), and the portions corresponding to the arm portions 8 and 9 in this leaf spring are bent at a right angle (see FIG. 5B). Simultaneously, the projection members 10 are also curved (see FIG. 5C), and then the supporting portions 4 and 5 are bent at a right angle relative to the central coupling plate portion 21 (see FIG. 5D), thereby the supporting member 20 shown in FIG. 2 being obtained.

Figure 4B:
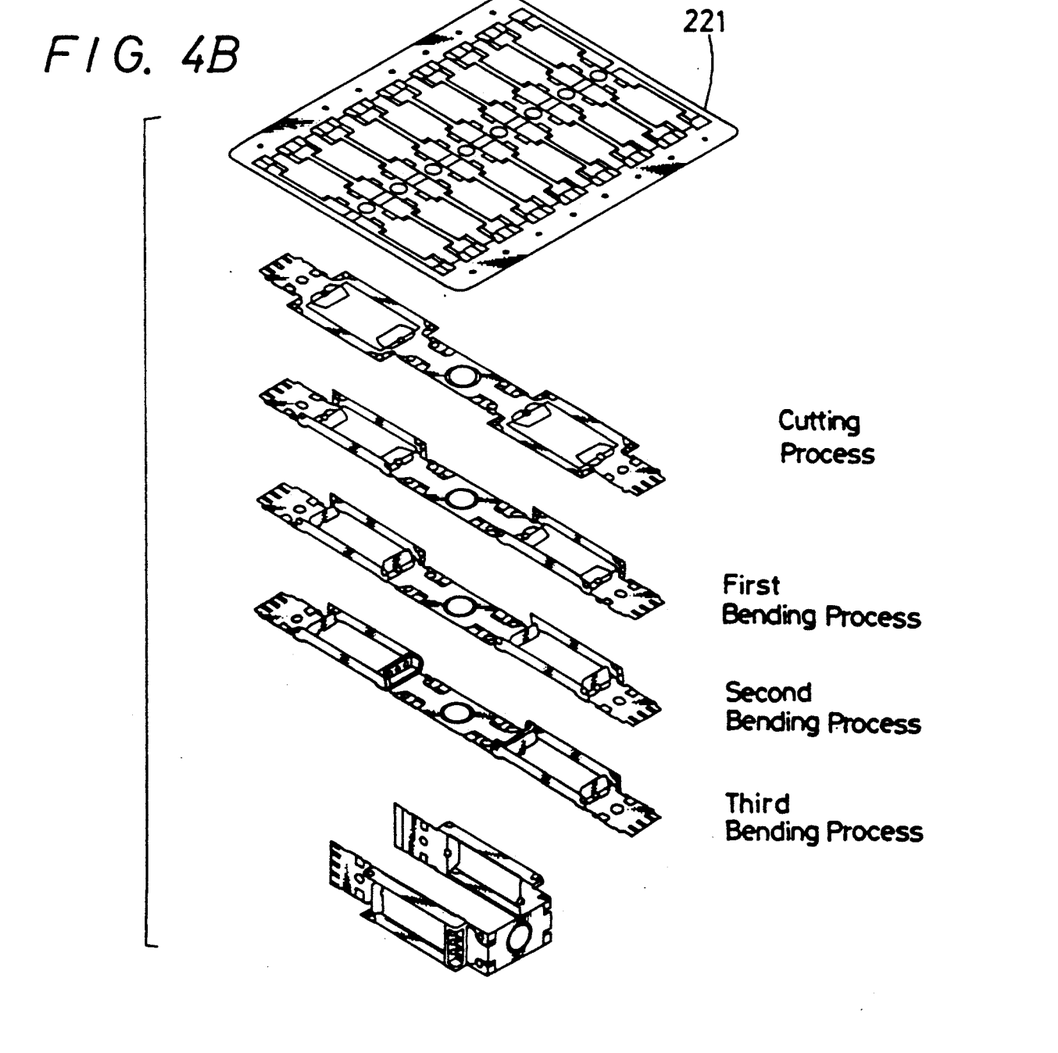
FIG. 4B is a perspective view illustrating a cutting process, a first bending process, a second bending process, and a third bending process in accordance with the invention.
Figure 5A:
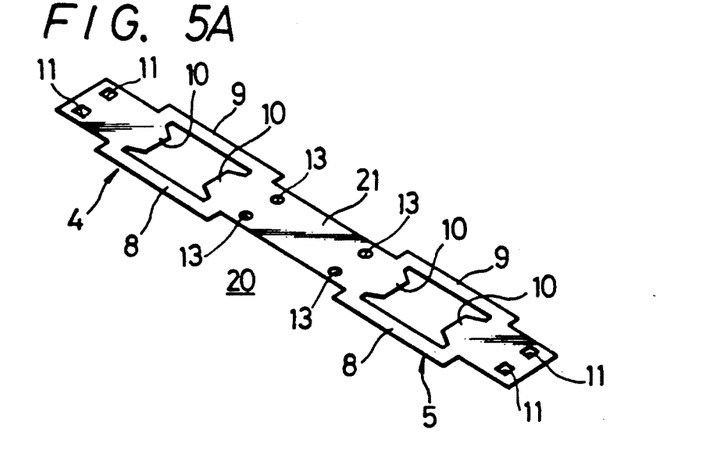
FIG. 5A is a perspective view of a supporting member at a predetermined stage of its manufacture.
Figure 5B:
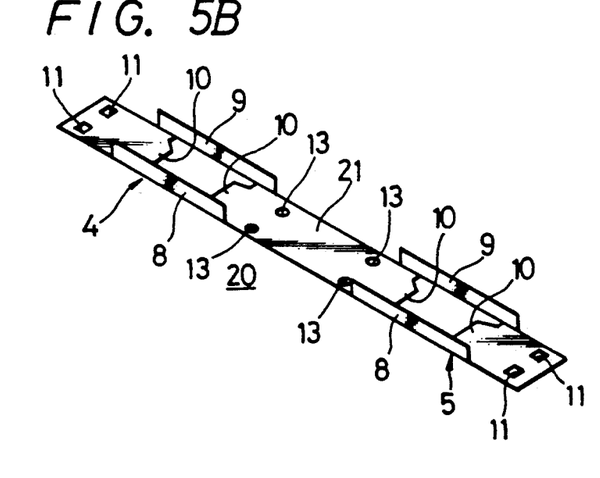
FIG. 5B is a perspective view of the supporting member of FIG. 5A at a subsequent stage of its manufacture.
Figure 5C:
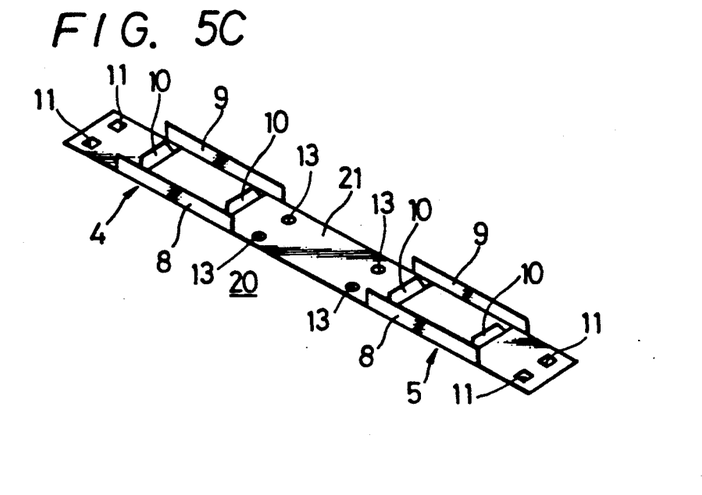
FIG. 5C is a perspective view of the supporting member of FIG. 5B at a subsequent stage of its manufacture.
Figure 5D:
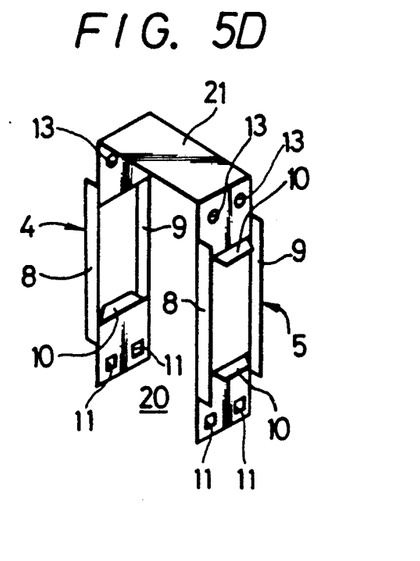
FIG. 5D is a perspective view of the supporting member of FIG. 5C at a subsequent stage of its manufacture.

Before the processes shown in FIG. 5A and the following, as shown in FIG. 4B, a flexible printed circuit board 221 for supplying electric power to the focusing coil 3a and the tracking coil 3b is bonded on the surface of the metal thin plate 22 by an adhesive agent or the like. The flexible printed circuit board 221 has also such an effect that the resonance of the arm portions 8 and 9, which are formed by bending portions of the metal thin plate 22, can be suppressed.

The structure in which the bobbin 2 is secured to the supporting member 20 and the structure in which the supporting member 20 is secured to the stationary base 15 are the same as those of the example of the prior art. More specifically, the projections 12 formed on the side portions of the bobbin 2 are inserted into the apertures 11 formed through the front ends of the two supporting portions 4 and 5 of the supporting member 20 and the heads of the projections 12 are caulked. Simultaneously, the projections 14a of the fixing member 14 are engaged in the apertures 13 formed through the rear ends of the two supporting portions 4 and 5 and the apertures 16 formed through the side portion of the base 15 and secured thereto.

In this objective lens driving apparatus, when the tracking coil 3b is supplied with a predetermined tracking current, the displacement portions 6a and 7a of the two supporting portions 4 and 5 of the supporting member 20 are flexed in the horizontal direction in parallel to each other so that the bobbin 2 can be moved in the second direction perpendicular to the optical axis of the objective lens 1, thereby the tracking operation being effected. When the focusing coil 3a is supplied with a predetermined focusing current, the arm portions 8, 8 and 9, 9 of the two supporting portions 4 and 5 are flexed in parallel to each other so that the bobbin 2 may be moved in the first direction parallel to the optical axis of the objective lens 1, thereby the focusing operation being performed.

The displacement portions 6a and 7a are formed by providing the apertures 6b and 7b through the supporting plate portions 6 and 7, respectively, in the above example. However, it is not always necessary to provide the apertures 6b and 7b. For example, instead of the apertures 6b and 7b, recess portions may be formed from the two edges of each of the supporting plate portions 6 and 7 so as to form the displacement portions 6a and 7a at the center portions of the supporting plate portions 6 and 7 with the same effect being achieved.

The objective lens driving apparatus of this embodiment is constructed as described above, and has many more advantages than those of the prior-art, which will be described below.

Since the left and right supporting members, which are independently constructed in the prior art, are unitarily formed, that is, the supporting member 20 is formed of the single leaf spring in the apparatus of the first embodiment, the characteristics of the left and right supporting portions 4 and 5 are made the same and high positional accuracy is achieved with ease. Accordingly, the bobbin 2 can be supported in a well-balanced condition and can be smoothly moved, thus making it possible to avoid the optical axis inclination or irregularity of the objective lens 1.

Further, since the supporting member 20 is simplified in construction in which the prior-art two parts are unitarily formed as the single constituent, the administration of the assembly parts can be performed with ease. Furthermore, in the assembly process, the number of assembly process steps can be reduced, which reduces the manufacturing cost.

Figure 6:
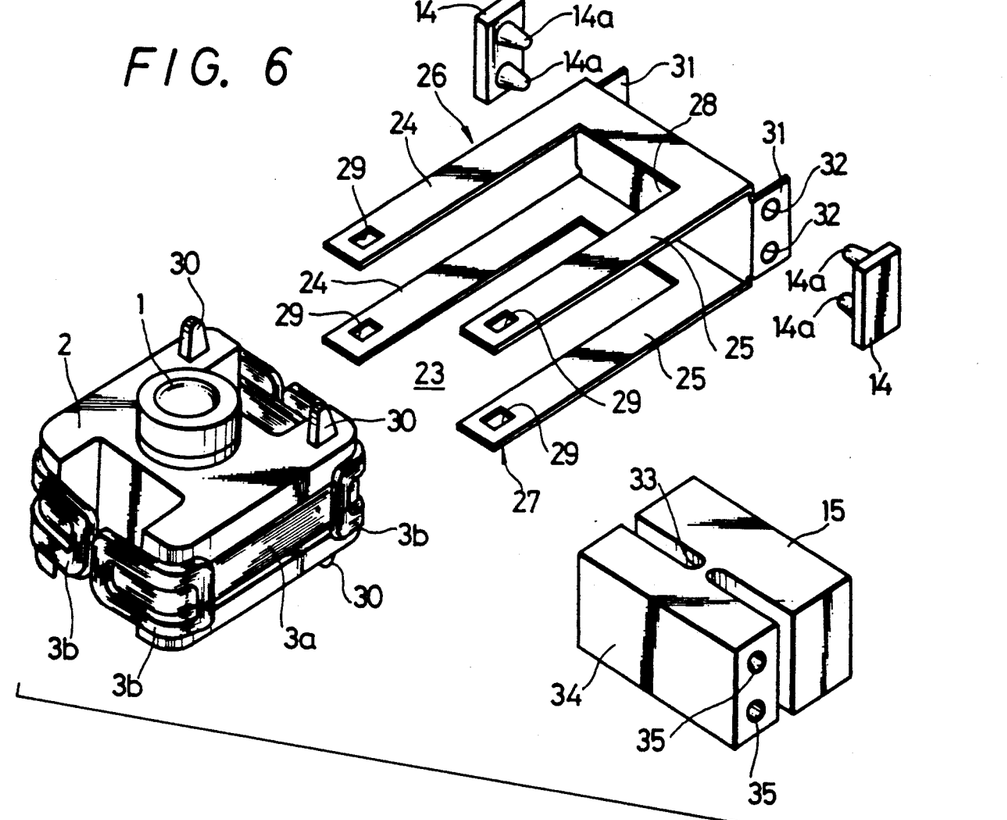
FIG. 6 is an exploded, perspective view of a second embodiment of the objective lens driving apparatus according to the present invention.
Figure 7:
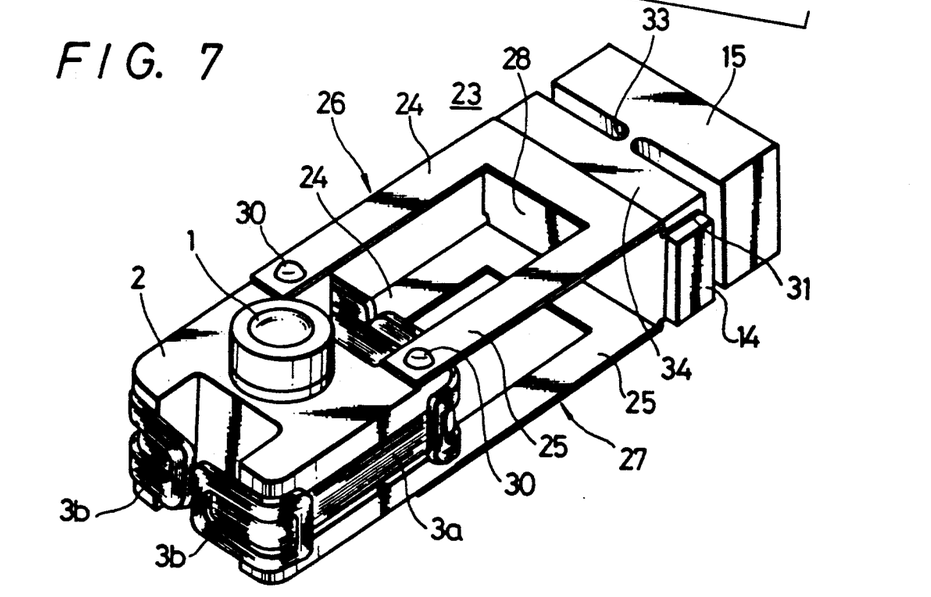
FIG. 7 is a perspective view of the second embodiment of the objective lens driving apparatus, and illustrating the assembled state of the objective lens driving apparatus.

A second embodiment of the objective lens driving apparatus according to the present invention will be described with reference to FIGS. 6 and 7. In FIGS. 6 and 7, like parts corresponding to those of FIGS. 2 and 3 are marked with the same reference numerals and therefore need not be described in detail.

In the second embodiment, the present invention is applied to an objective lens driving apparatus which is provided with a supporting member for movably supporting the objective lens 1.

More specifically, as shown in FIGS. 6 and 7, a supporting member 23 in this embodiment is formed by one leaf spring which is a combination of upper and lower supporting portions 26 and 27 having two pairs of arm portions 24 and 25 and a coupling plate portion 28 which couples four arm portions 24, 24 and 25, 25 of the upper and lower supporting portions 26 and 27 at the rear side thereof. Rectangular apertures 29 are formed through the front ends of the four arm portions 24, 24 and 25, 25 as shown in FIG. 6. These apertures 29 are engaged with protrusions 30 formed on the upper and lower surfaces of the bobbin 2 and the heads of the protrusions 30 are caulked, thereby the bobbin 2 being secured to the front end of the supporting member 23. Further, projections 31 extend from the respective side ends of the coupling plate portion 28 of the supporting member 23 and are bent rearwards at a right angle. Furthermore, apertures 32 are formed through the projections 31.

A movable member 34 is unitarily provided at the front surface of the stationary base portion 15 through a connecting neck portion 33 of small width in such a manner that it can be rotated in the horizontal direction. The supporting member 23 is secured to the movable member 34 by means of the fixing member 14. More precisely, the apertures 32 of the projections 31 are made to correspond with apertures 35 formed through the two side portions of the movable member 34, whereby the protrusions 14a of the fixing member 14 are communicated through the two apertures 32 and 35 so as to be inserted and secured thereto.

In the objective lens driving apparatus of the second embodiment thus constructed, when the tracking coil 3b is supplied with a predetermined tracking current, the movable member 34 is rotated about the connection portion 33 thereof relative to the stationary base portion 15 in the horizontal direction, whereby the bobbin 2 is positionally moved in the second direction perpendicular to the optical axis of the objective lens 1, thereby the tracking operation being performed. When on the other hand the focusing coil 3a is supplied with a predetermined focusing current, the four arm portions 24, 24 and 25, 25 of the supporting member 23 are flexed in the vertical direction so that the bobbin 2 is positionally moved in the first direction parallel to the optical axis of the objective lens 1, thereby the focusing operation being carried out. In the focusing operation, the supporting member 23 is formed by the single leaf spring so that the characteristics of the four arm portions 24, 24 and 25, 25 are the same. Therefore, the bobbin 2 is driven in a well-balanced condition, making it possible to prevent the optical axis inclination or irregularity of the objective lens 1 from occurring.

As set forth above, in the objective lens driving apparatus of this invention, since the supporting member for movably supporting the objective lens is formed of the single leaf spring, the characteristics of the supporting member can be prevented from fluctuating. Therefore, the objective lens can be positively supported and driven in a well-balanced condition, thus the so-called optical axis inclination or irregularity being removed.

Further, the administration of the assembly parts can be performed with ease, and the number of assembly process steps can be reduced, which fact can reduce the manufacturing cost. Thus, the objective lens driving apparatus of the present invention can achieve various advantages in practice unlike the prior art.

Having described preferred embodiments of the invention with reference to the accompanying drawings, it is to be understood that the invention is not limited to those precise embodiments and that various changes and modifications could be effected by one skilled in the art without departing from the spirit or scope of the novel concepts of the invention as defined in the appended claims.

We claim as our invention:

1. An optical pickup device with an objective lens movable in two directions, said optical pickup device comprising:

supporting means for supporting a bobbin on which an objective lens is mounted, said supporting means comprising a supporting member formed of a thin metal plate having a predetermined rigidity for supporting said bobbin so that said bobbin may be moved in a first direction parallel to an optical axis of said objective lens and a second direction perpendicular to the optical axis of said objective lens;

electromagnetic driving means for driving said bobbin so that said bobbin is selectively moved in either of said first and second directions, wherein said supporting member is unitarily formed of four substantially parallel arm portions having first and second ends, said bobbin being supported adjacent to said first ends of said four arm portions, and a coupling portion for coupling said four arm portions adjacent to said second ends of said four arm portions; and a fixed base portion connected adjacent to said second ends of said four arm portions.

2. An optical pickup device as claimed in claim 1 wherein each of said arms extends in a plane substantially perpendicular to the optical axis of said objective lens, thereby facilitating movement of said bobbin in said first direction.

3. An optical pickup device as claimed in claim 2 wherein said supporting member is provided with flexible displacement portions to facilitate movement of said bobbin in said second direction.

4. An optical pickup device as claimed in claim 2 wherein said fixed base portion comprises a movable member attached to said coupling portion, a stationary member, and a neck portion flexibly connecting said movable member and said stationary member so that said bobbin can be moved in said second direction.

* * * * *